United States Patent
Ishii (10) Patent No.: US 8,466,871 B2
(45) Date of Patent: Jun. 18, 2013

(54) INPUT APPARATUS FOR IN-VEHICLE DEVICES

(75) Inventor: Kosei Ishii, Chiba (JP)

(73) Assignees: Hyundai Motor Japan R&D Center, Inc., Chiba (JP); Hyundai Motor Company, Seoul (KR); Kia Motors Corporation, Seoul (KR)

( * ) Notice: Subject to any disclaimer, the term of this patent is extended or adjusted under 35 U.S.C. 154(b) by 372 days.

(21) Appl. No.: 12/557,757

(22) Filed: Sep. 11, 2009

(65) Prior Publication Data

US 2010/0220053 A1    Sep. 2, 2010

(30) Foreign Application Priority Data

Feb. 27, 2009   (JP) .................. 2009-046169

(51) Int. Cl.
*G09G 5/00*   (2006.01)
*G06F 3/041*  (2006.01)

(52) U.S. Cl.
USPC .......................................... 345/156; 345/173

(58) Field of Classification Search
USPC ................... 345/156, 158, 173, 175
See application file for complete search history.

(56) References Cited

U.S. PATENT DOCUMENTS

| | | | | |
|---|---|---|---|---|
| 5,095,302 A * | 3/1992 | McLean et al. | ............... | 345/164 |
| 5,594,469 A | 1/1997 | Freeman et al. | | |
| 6,498,628 B2 | 12/2002 | Iwamura | | |
| 2002/0075334 A1 | 6/2002 | Yfantis | | |
| 2008/0182632 A1* | 7/2008 | Jung | ..................... | 455/575.1 |
| 2008/0264945 A1* | 10/2008 | Shek | ........................ | 220/260 |
| 2009/0092291 A1* | 4/2009 | Nagasaka et al. | ............. | 382/115 |
| 2009/0167682 A1* | 7/2009 | Yamashita et al. | ............. | 345/158 |

FOREIGN PATENT DOCUMENTS

| | | |
|---|---|---|
| EP | 1 187 055 A2 | 3/2002 |
| JP | 2004-142656 A | 5/2004 |
| JP | 2007-237986 A | 9/2007 |
| JP | 2008-059430 A | 3/2008 |
| KR | 10-1999-0061763 | 7/1999 |
| KR | 10-2008-0029730 A | 4/2008 |
| KR | 10-2008-0041049 A | 5/2008 |
| KR | 10-2008-0072156 A | 8/2008 |
| WO | 2006/013783 A1 | 2/2006 |
| WO | WO 2007088942 A1 * | 8/2007 |

* cited by examiner

*Primary Examiner* — Joseph Haley
*Assistant Examiner* — Nicholas Lee
(74) *Attorney, Agent, or Firm* — Edwards Wildman Palmer LLP; Peter F. Corless (57) ABSTRACT

An input apparatus for in-vehicle devices is easy to use and facilitates recognizing the position of fingertips. For this, the input apparatus includes a control unit including a recess allowing fingers to be inserted thereinto and having a control surface on an inner side wall thereof, a control switch disposed on the control surface, and a camera horizontally photographing the fingers inserted into the recess; and a display unit displaying an image of the fingers photographed by the camera to overlay on a control screen.

5 Claims, 10 Drawing Sheets

FIG.10

# INPUT APPARATUS FOR IN-VEHICLE DEVICES

CROSS-REFERENCE TO RELATED APPLICATION

This application claims under 35 U.S.C. §119(a) the benefit of Japanese Patent Application No. 2009-046169 filed Feb. 27, 2009, the entire contents of which are incorporated herein by reference

BACKGROUND OF THE INVENTION

1. Field of the Invention

The present invention relates to an input apparatus for in-vehicle devices, and more particularly, to an input apparatus for in-vehicle devices, which is easy to use and facilitates recognizing the position of fingertips.

2. Description of the Related Art

As is well-known in the art, a preferred input apparatus typically includes a control unit equipped with a camera and a control switch on a center console adjacent to a shift lever of a vehicle, and a display unit mounted on a dashboard. The camera photographs a hand placed on the control unit, and an image of fingers photographed by the camera is synthesized to a control screen of the display unit.

Figure 8:
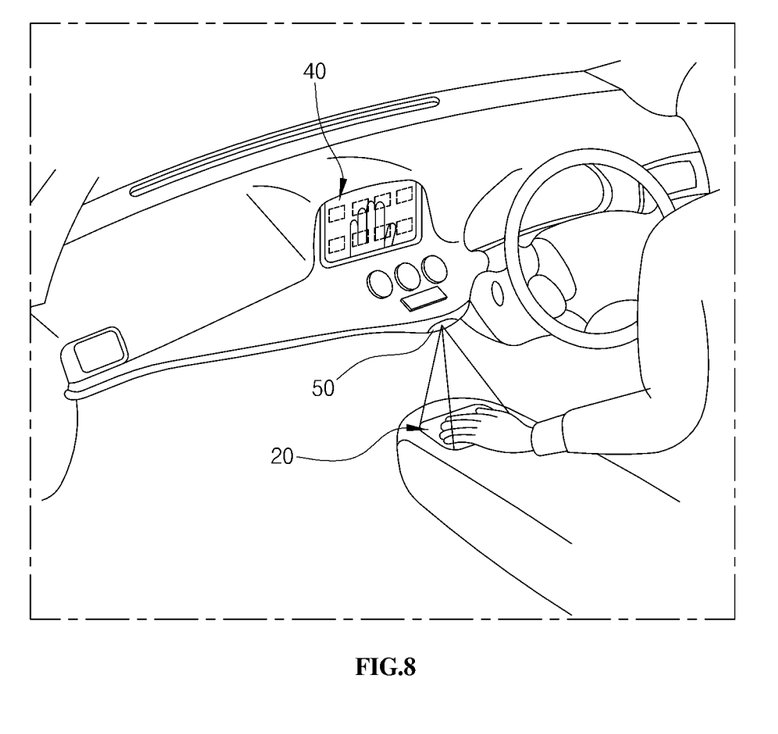
FIG. 8 is a configuration view illustrating a conventional input apparatus for in-vehicle devices.
Figure 9:
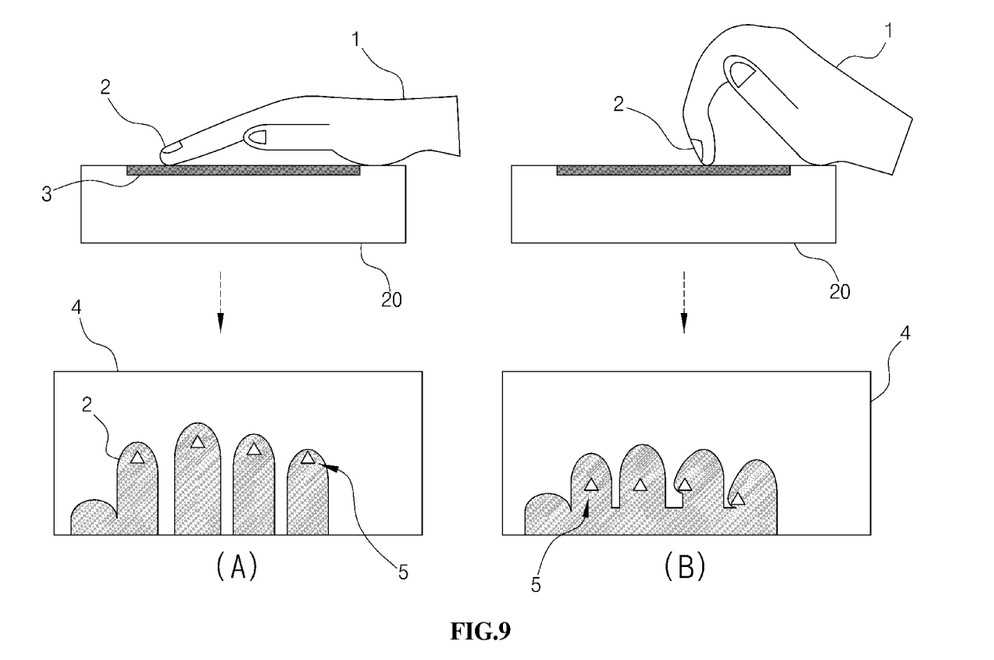

For example, an input apparatus as disclosed in Korean Patent Application Publication No. 2007-237986, incorporated by reference in its entirety herein, has a control unit 20 as shown in FIG. 8. The hand performing an operation is photographed from above by a camera 50, and the resultant photographs are synthesized by a display unit 40. FIGS. 9A and 9B illustrate images of the hand 1 photographed by the input apparatus shown in FIG. 8. As shown in FIG. 9A, when fingers 2 are spread on top of the control unit 20, it is relatively easy to assume the position of contact points 5 (marked with symbols "Δ") on an operating switch 3, which the fingers 2 are attempting to press, and to recognize the position of places which the fingers are attempting to press from a control screen.

However, as shown in FIG. 9B, the fingers 2 are bent when attempting to operate the control switch 3 with the tips of the fingers 2, and thus the contact points 5 (marked with "Δ") are covered by the image of the fingers 2. Accordingly, even if the photographed image 4 is displayed on the control screen, it is difficult to recognize an operation button shown on the display unit 40, which the tip of the fingers 2 is attempting to press.

Figure 10:
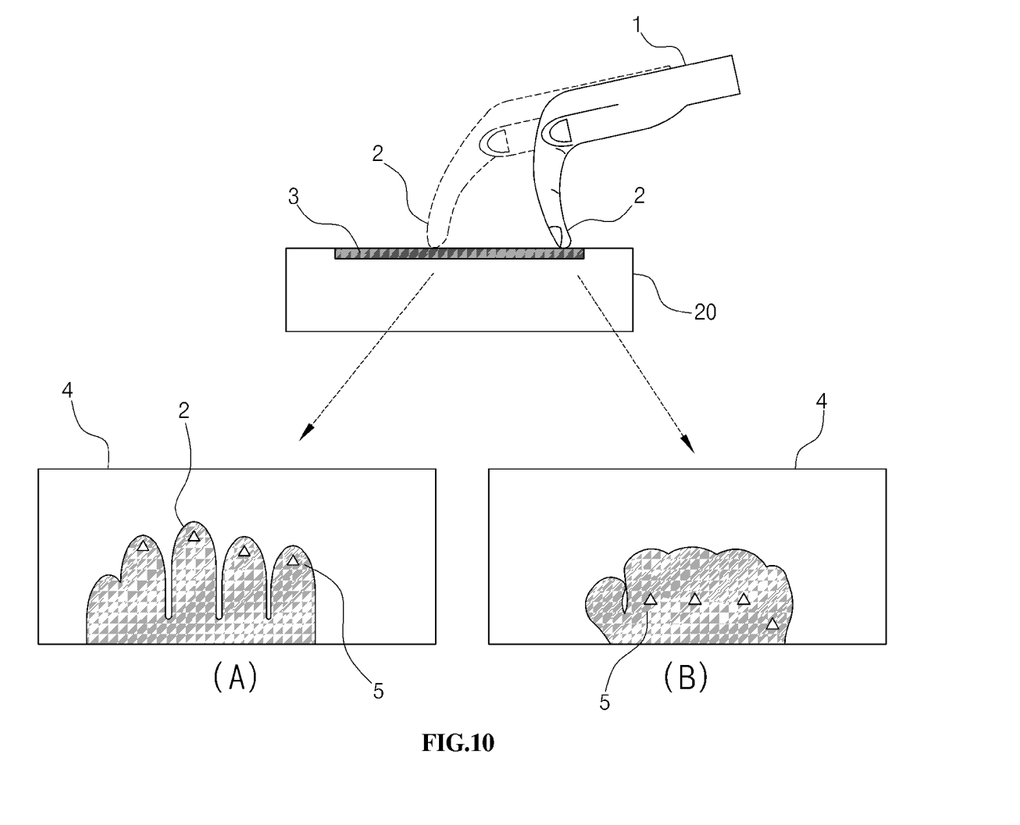
FIG. 10 illustrates the fingers operating the control unit shown in FIG. 8 with the hand not placed on the arm rest, in which part (A) of FIG. 10 illustrates the fingers placed on the front portion of the control unit, and part (B) of FIG. 10 illustrates the fingers bent towards the wrist.

As shown in FIG. 10, in some cases, an operator may operate the input apparatus without placing the hand on an arm rest. In this case, as shown in part (B) of FIG. 10, the fingers 2 are placed further inwards on the screen and are covered by the palm. As a result, even if the photographed hand 1 is seen from the control screen 4, it is much more difficult to recognize the operation button shown on the display unit 40, which the tip of the fingers 2 is attempting to press.

The above information disclosed in this the Background section is only for enhancement of understanding of the background of the invention and therefore it may contain information that does not form the prior art that is already known in this country to a person of ordinary skill in the art.

SUMMARY OF THE INVENTION

In one aspect, the present invention provides an input apparatus for in-vehicle devices, which is easy to use and facilitates recognizing the position of fingertips.

According to preferred aspects of the invention, the input apparatus for in-vehicle devices may preferably include a control unit including a recess allowing fingers to be suitably inserted threreinto and having a control surface on an inner side wall thereof, a control switch disposed on the control surface, and a camera horizontally photographing the fingers inserted into the recess; and a display unit preferably displaying an image of the fingers photographed by the camera to overlay on a control screen.

In certain embodiments, the control surface may preferably be a vertical surface on an inner side wall of the recess.

In other embodiments, the control switch may preferably be a touch panel or a push button switch.

In certain embodiments, the control unit may further include a cover on an opening of the recess, for suitably preventing contaminants from entering the recess.

In other certain embodiments, the control unit may further comprise a proximity sensor suitably disposed adjacent to the recess to detect a hand, wherein the cover is automatically opened and closed by the proximity sensor or by the operation of a switch.

Preferably, the input apparatus for in-vehicle devices may suitably include a control unit including a recess allowing fingers to be suitably inserted threreinto and having control surfaces on opposite inner side walls thereof, control switches disposed on the control surfaces, respectively, and a camera horizontally photographing the fingers inserted into the recess; and a display unit preferably displaying an image of the fingers photographed by the camera to overlay on a control screen.

In certain embodiments, the control surfaces may be vertical surfaces opposing each other, so that the fingers inserted into the recess are suitably interposed between the vertical surfaces.

Preferably, one of the control switches may be used to suitably operate a first display section of the display unit, and the other one of the control switches may be used to suitably operate a second display section of the display unit.

In other embodiments, one of the control switches placed between the camera and the fingers inserted into the recess may preferably be transparent, and the control switches placed between the camera and the fingers inserted into the recess may preferably be a touch panel or a push button switch.

According to embodiments of the invention, the input apparatus for in-vehicle devices can suitably obtain an image from which the fingertips or fingernails can be easily recognized due to the recess, which allows the fingers to be inserted threreinto and preferably has a control surface on the inner side wall thereof, and the camera horizontally photographing the fingers suitably inserted into the recess. Since the finger or nail tips can be easily recognized, it is possible to accurately control the control switch as well as prevent its erroneous operation. Since the fingers are not displayed unless they are inserted into the recess, the hand or the fingers outside the recess are not photographed or displayed. Accordingly, any image processing on unnecessary parts is suitably avoided.

Preferably, when the control switches are provided on both the inner side walls of the recess, the control switches can be pressed by both the inner side (the side of the finger with the fingerprints on it) and the nails of the fingers. In certain preferred embodiments of the invention, the first control screen (e.g., an air conditioner control screen) can be suitably operated by the first control switch, whereas the second control screen (e.g., a car navigator control screen) can be suitably operated by the second control switch. Since two types of in-vehicle devices can be easily operated with one hand, convenience and functionality are advantageously improved.

Preferably, the cover is provided to suitably open and close the opening of the recess, thereby prevent contaminants from entering the recess. Accordingly, the recess can be maintained clean. In particular embodiments, an automatic cover that automatically opens and closes when the hand approaches the recess and moves away from the recess can be suitably applied to improve the convenience of a driver.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 3A and 3B illustrate fingers operating the control unit shown in FIG. 1, in which FIG. 3A illustrates a case where the lower portion of the control switch is being pressed, and FIG. 3B illustrates a case where the upper portion of the control switch is being pressed;

FIGS. 4A and 4B illustrate fingers operating the control unit shown in FIG. 2, in which FIG. 4A illustrates a case where the lower portion of the control switch is being pressed, and FIG. 4B illustrates a case where the upper portion of the control switch is being pressed;

FIGS. 9A and 9B illustrate fingers operating the control unit shown in FIG. 8 with the hand placed on an arm rest, in which FIG. 9A illustrates the fingers horizontally spread on top of the control unit, and FIG. 9B illustrates the fingers bent on top of the control unit.

DETAILED DESCRIPTION OF THE INVENTION

As described herein, present invention includes an input apparatus for in-vehicle devices, comprising a control unit, and a display unit.

In one embodiment, the control unit comprises a recess allowing fingers to be inserted thereinto, a control surface, a control switch disposed on the control surface, and a camera photographing the fingers inserted into the recess.

In another embodiment, the control surface is on an inner side wall thereof.

In another embodiment, the control switch is disposed on the control surface.

In yet another embodiment of the invention, the display unit displays an image of the fingers taken by the camera while overlaying on a control screen.

The invention also features, in other preferred embodiments, a motor vehicle comprising the input apparatus of any one of the aspects as described herein.

A preferred input apparatus for in-vehicle devices of the present invention will now be described more fully hereinafter to reference to the accompanying drawings, in which exemplary embodiments thereof are shown.

Figure 1:
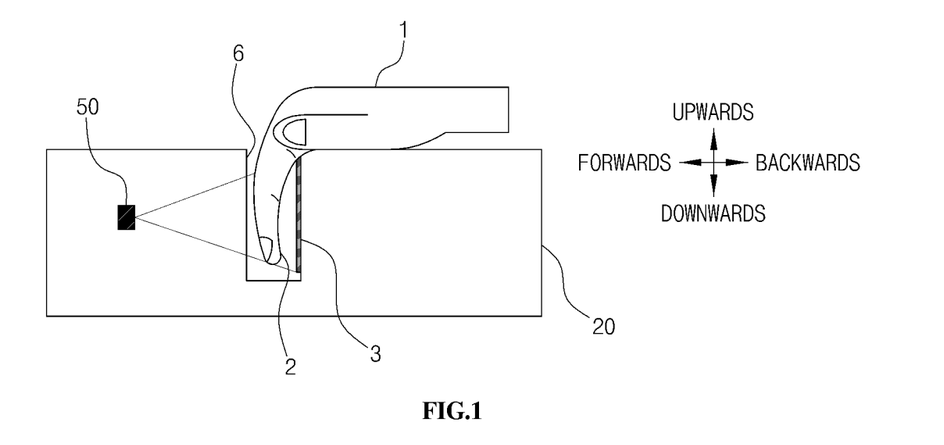
FIG. 1 is a cross-sectional view illustrating a control unit of an input apparatus of the invention in which a control switch is provided on one side wall of a recess (first embodiment)

In one preferred embodiment of the invention, for example as shown in FIG. 1, a cross-sectional view illustrates a control unit 20 of an input apparatus of the invention in which a control switch 3 is suitably provided on one side wall of a recess 6 (first embodiment). In a preferred embodiment of the invention, inside a vehicle, the control unit 20 is suitably disposed separated from a display unit. In exemplary embodiments, when performing an operation, fingers 2 are suitably inserted into the recess 6, preferably with a hand 1 placed on the control unit 20. Preferably, a vertical operating surface is provided inside the recess 6. In further preferred embodiments, a camera 50 is suitably provided in the front portion of the control unit 2, outside the recess 6, to horizontally photograph the fingers 2. A control switch 3 is suitably provided on the rear inner portion of the recess 6, and is implemented with a touch panel. The outline of the fingers 2 is extracted from an image photographed by the camera 50, and is then synthesized on a control screen of a display unit 40. This allows a user to suitably operate the control unit 20 while watching the image of the fingers 2 on the display unit 40 instead of the control unit 20. Preferably, in order to operate the control switch 3, the user presses the control switch 3 with the inner side (fingerprint side) of the fingers 2, which are inserted into the recess 6.

Figure 2:
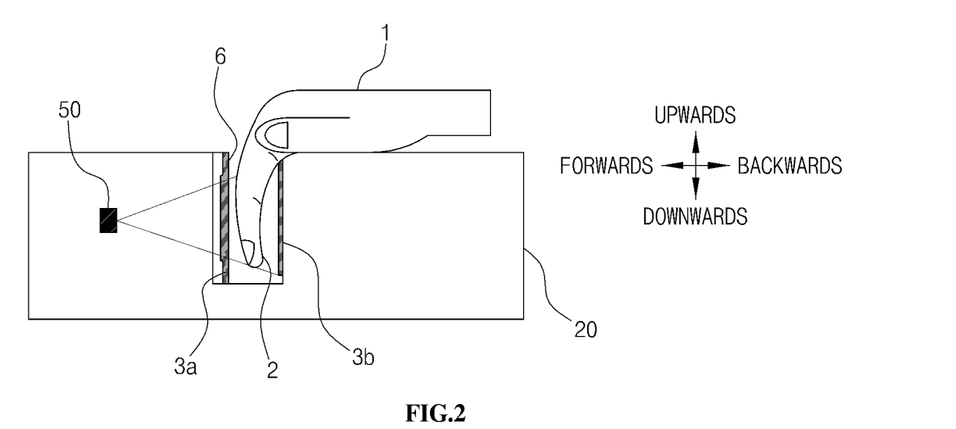
FIG. 2 is a cross-sectional view illustrating a control unit of an input apparatus of the invention in which control switches are provided on both side walls of a recess (second embodiment)

FIG. 2 is a cross-sectional view illustrating an exemplary control unit 20 of an input apparatus of the invention in which control switches 3a and 3b are suitably provided on both side walls of a recess 6 (second embodiment). In preferred exemplary embodiments of the invention, when performing an operation, fingers 2 are suitably inserted into the recess 6, with a hand 1 placed on the control unit 20. Suitable operation surfaces are provided on both side walls of the recess, and the operation surfaces on one side and the other side can suitably oppose each other, with the fingers interposed between the operation surfaces.

Preferably, a camera 50 is provided in the front portion of the control unit 2, outside the recess 6, to suitably horizontally photograph the fingers 2. Preferably, the first and second control switches 3a and 3b are suitably provided on the front and rear inner portions of the recess 6, respectively, and are implemented with a touch panel. The first control switch 3a adjacent to the camera 50 (i.e., placed between the fingers and the camera) is suitably formed transparent such that part of the hand 1 inserted into the recess 6 (i.e., the fingers 2) can be photographed by the camera 50. For example, in certain embodiments, the first control switch can be suitably implemented with a resistive touch screen having transparent electrodes. The outline of the fingers 2 is suitably extracted from an image photographed by the camera 50, and is then synthesized on a control screen of a display unit 40. Preferably, this allows a user to operate the control unit 20 while watching the image of the fingers 2 on the display unit 40. In order to operate the control switches, the user suitably presses the first control switch 3a with for example a nail and presses the second control switch 3b with the inner side (fingerprint side) of the fingers 2, which are suitably inserted into the recess 6.

In certain preferred embodiments, for example as shown in FIGS. 1 and 2, the recess 6 does not provide a large space in the forward and backward directions, but allows the spread fingers 2 to move upwards and downwards. Here, in further embodiments, the fingers 2 can also move to the right and left (i.e., perpendicular to the plane of the sheet). In further embodiments, since the fingers 2 hinge on the wrist as the fulcrum, it is easy to move the fingers 2. In addition, since the tip of a finger image matches the tip of the actual fingers, the position of fingertips can be easily recognized without any inconsistency between the image and the actual fingers. Preferably, the control switches can be implemented with a plurality of push button switches in place of the touch panel. In certain preferred embodiments, for example as shown in FIGS. 1 and 2, the camera 50 can also be installed in the rear portion of the control unit 20, outside the recess 6, and the second control switch adjacent to the camera (i.e., placed between the camera and the fingers inserted into the recess) is preferably implemented with a transparent touch panel.

Figure 3:
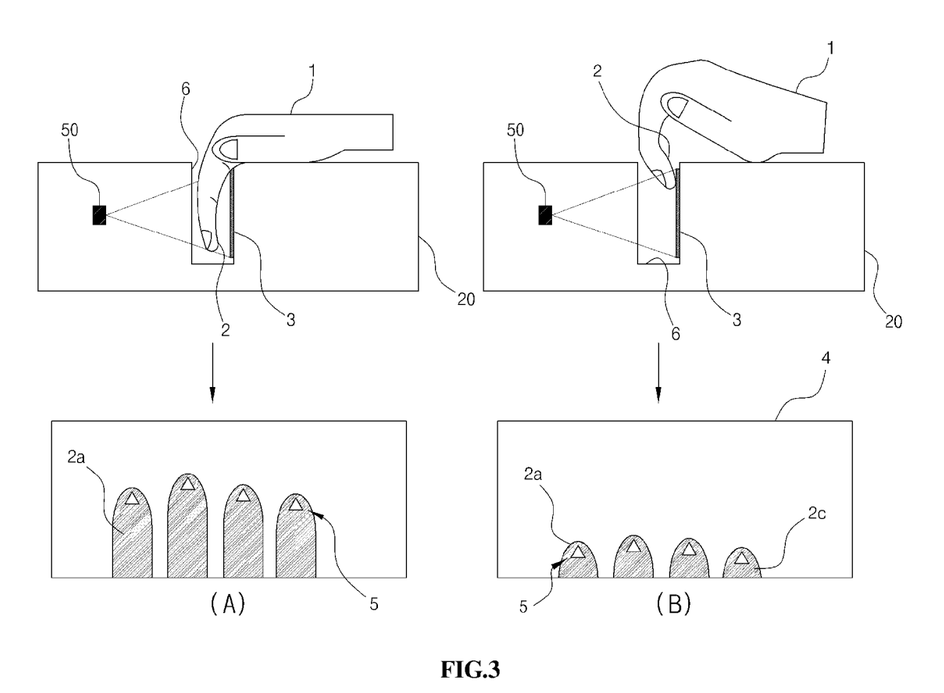

In other preferred embodiments, FIGS. 3A and 3B illustrate the fingers operating the control unit 20 shown in FIG. 1. In particular embodiments, for example as shown in FIG. 3A, is a case where the lower portion of the control switch 3 is being pressed. In further embodiments, for example as shown in the figure, the fingers 2 are suitably spread when they are pressing the lower portion of the control switch 3 inside the recess 6. This as a result makes it easy to recognize the position of the tips of the fingers 2 on an image 4 photographed by the camera 50. In other preferred embodiments, FIG. 3B illustrates a case where the upper portion of the control switch 3 is being pressed. Even though the fingers 2 may be bent when they are pressing the upper portion of the switch 3 inside the recess 6, the bent portions of the fingers are suitably located outside the recess 6. Thereby, the position of the tip of the fingers 2 can be easily recognized on an image 4 photographed by the camera 50. Preferably, the image photographed by the camera 50 is vertically reversed so that the index finger 2a of the right hand is placed to the left of FIGS. 3A and 3B.

Figure 4:
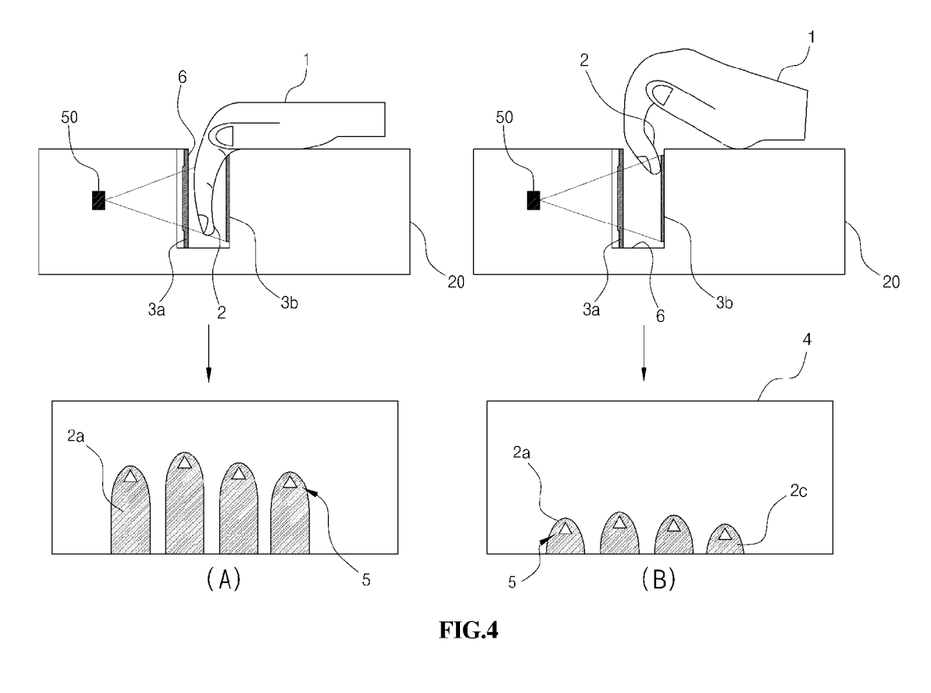

FIGS. 4A and 4B illustrate other exemplary embodiments of the invention where the fingers preferably operate the control unit 20 shown in FIG. 2. Particularly, in preferred embodiments for example as shown in FIG. 4A, a preferred case is where the lower portion of the first or second control switch 3a or 3b is being pressed by the right hand. Preferably, the fingers 2 are spread when they are suitably pressing the lower portion of the control switch 3a or 3b inside the recess 6. This as a result makes it easy to recognize the position of the tip of the fingers 2 on an image 4 photographed by the camera 50. In further preferred embodiments, FIG. 4B illustrates a case where the upper portion of the control switch 3a or 3b is being suitably pressed. In certain preferred embodiments, even though the fingers 2 may be suitably bent when they are pressing the upper portion of the switch 3a or 3b inside the recess 6, the bent portions of the fingers are located outside the recess 6. Accordingly, the position of the tip of the fingers 2 can be easily recognized on an image 4 photographed by the camera 50. Preferably, the image photographed by the camera 50 is vertically reversed so that the index finger 2a of the right hand is suitably placed to the left of FIGS. 4A and 4B.

Figure 5:
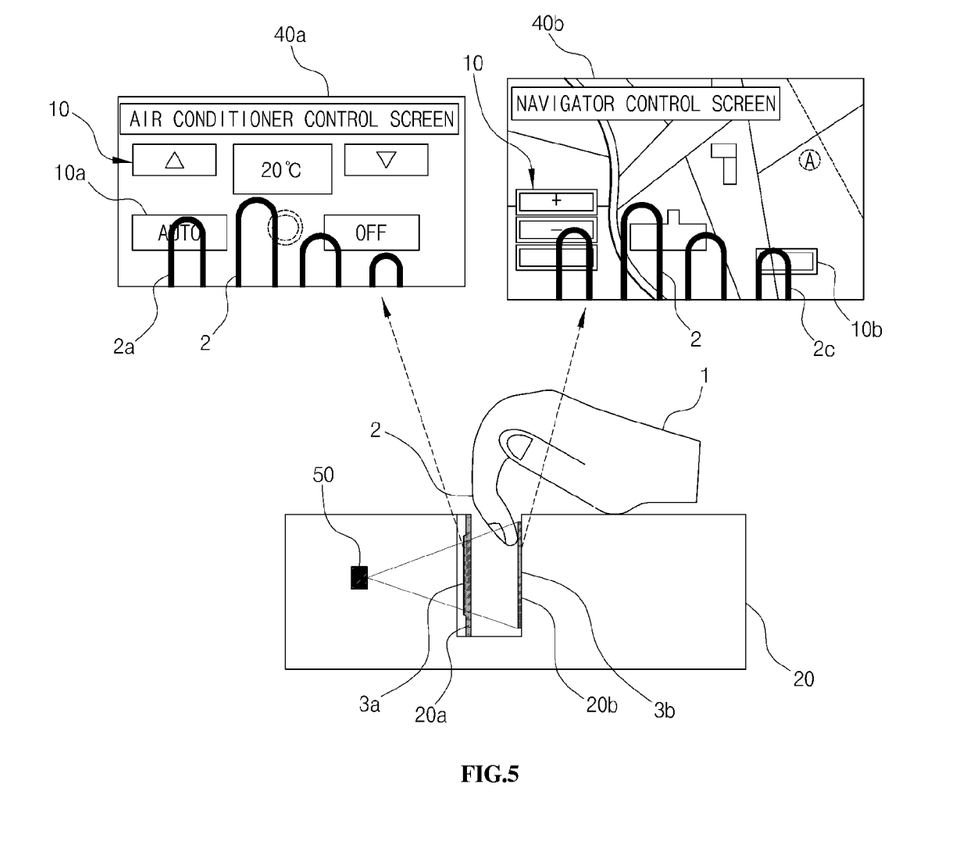
FIG. 5 illustrates images of the fingers, which are photographed in FIGS. 1 and 2 and are then synthesized on two control screens of a display unit.

Other preferred embodiments, for example exemplary FIG. 5, illustrates images of fingers synthesized on control screens of the display unit 40. Preferably, the display unit 40 is suitably constructed with two display sections such as a first display section 40a and a second display section 40b. For example, the first display section 40a may suitably display a control screen of an air conditioner, which is not frequently operated, as a first control screen, and the second display section 40b may suitably display a control screen of a car navigator, which is constantly operated, as a second control screen. The control screen of the first display section 40a can be converted into for example an audio control screen if necessary. In other preferred embodiments, if the first and second display sections 40a and 40b are illustrated as being physically separated from each other, both the first control screen and the second control screen can be suitably realized in one display unit. For example, in certain embodiments, the image of the fingers 2 can be preferably reshaped according to the sizes of the first and second display sections 40a and 40b. In addition, a sign indicating whether the fingers 2 are operating the control unit at the nail or the inner side (i.e., the fingerprint side) can also be suitably displayed together with the image of the fingers 2 on the first and second control screens.

In further embodiments of the invention, for example as shown in FIG. 5, the outline of the fingers 2 is extracted from the photographed image and is then synthesized to the control screens of the first and second display sections 40a and 40b. Preferably, the images of the fingers 2 displayed on the control screens can be set to be suitably the same. Preferably, since a variety of control menu buttons 10 are generally designed in the lower portion of the control screen, the lower portion of the first and second display sections 40a and 40b can be preferably set to match the upper portion of the recess 6. In further preferred embodiments, even if the fingers 2 are inserted deep into the recess 6, the tip of the fingers 2 can be suitably moved across the control menu buttons 10 displayed on the control screen. Here, in exemplary embodiments, when the tip of the index finger 21 is placed on an "AUTO" button of the air conditioner control screen of the display section 40a, an instruction to set an air conditioner to an automatic status is given by suitably pressing the first control switch 3a with the nail of the index finger 2a. In addition, when the tip of the little finger 2c is preferably placed on a "RETURN" button 10b of the control screen of the car navigator of the display section 40b, an instruction to restore the present display screen to the initial screen is suitably given by pressing the second control switch 3b with the inner side (i.e., the fingerprint side) of the little finger 2c. As such, in further preferred embodiments, the first and second display sections 40a and 40b are designed to suitably match the first and second control switches 3a and 3b, respectively. Thereby, instructions to the control menu buttons can be quickly given.

Figure 6:
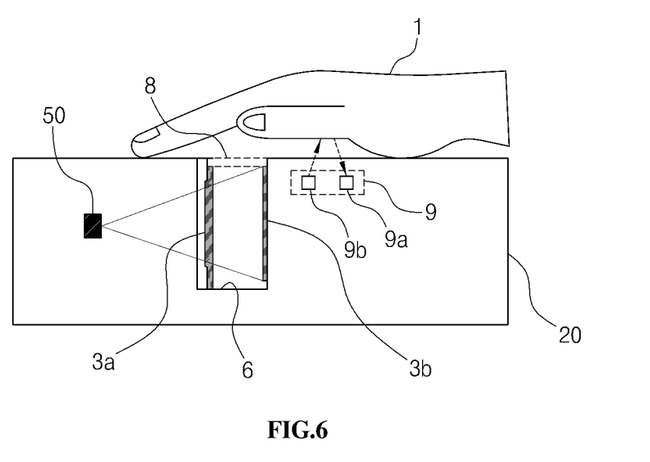
FIG. 6 is a cross-sectional view illustrating an automatic cover mounted on the recess.

In other preferred embodiments of the invention, for example as shown in FIG. 6, a cross-sectional view illustrates an automatic cover 8 suitably mounted on the recess. Preferably, the automatic cover 8 can suitably prevent trifling articles such as, but not limited to, coins from dropping into the recess 6. Preferably, in order to enable an automatic opening/closing operation of the automatic cover 8, a proximity sensor 9 is suitably provided to detect a motion of the hand 1 of the operator on the control unit 20. Preferably, the proximity sensor 9 detects whether the hand 1 of the operator is approaching or moving away from the recess. In further preferred embodiments, the proximity sensor 9 can preferably be a reflective infrared proximity sensor suitably including a light-emitting element 9a and a light-receiving element 9b. Preferably, when the power of infrared rays reflected from the hand 1 becomes a predetermined level or more as the hand 1 approaches the recess 6, the automatic cover 8 is suitably opened by a drive mechanism (not shown) such as a drive motor. In other preferred embodiments, when the power of infrared rays reflected from the hand 1 becomes less than the predetermined level as the hand 1 moves away from the recess 6, the automatic cover 8 is suitably closed by the drive motor. In other embodiments of the invention, the proximity sensor is not suitably limited to the reflective sensor, but can be suitably implemented with a capacitance type proximity sensor in which the capacitance of a capacitor can be suitably changed in response to the approach of the hand. Preferably, the cover 8 opening and closing the opening of the recess 6 can be a switch-operating cover, which is operated by the user in person, rather than the above-described automatic cover that is automatically opened or closed as the proximity sensor 9 suitably detects the hand. Then, an additional switch, by which the user operates the switch-operating cover to open and close, is preferably provided.

Figure 7:
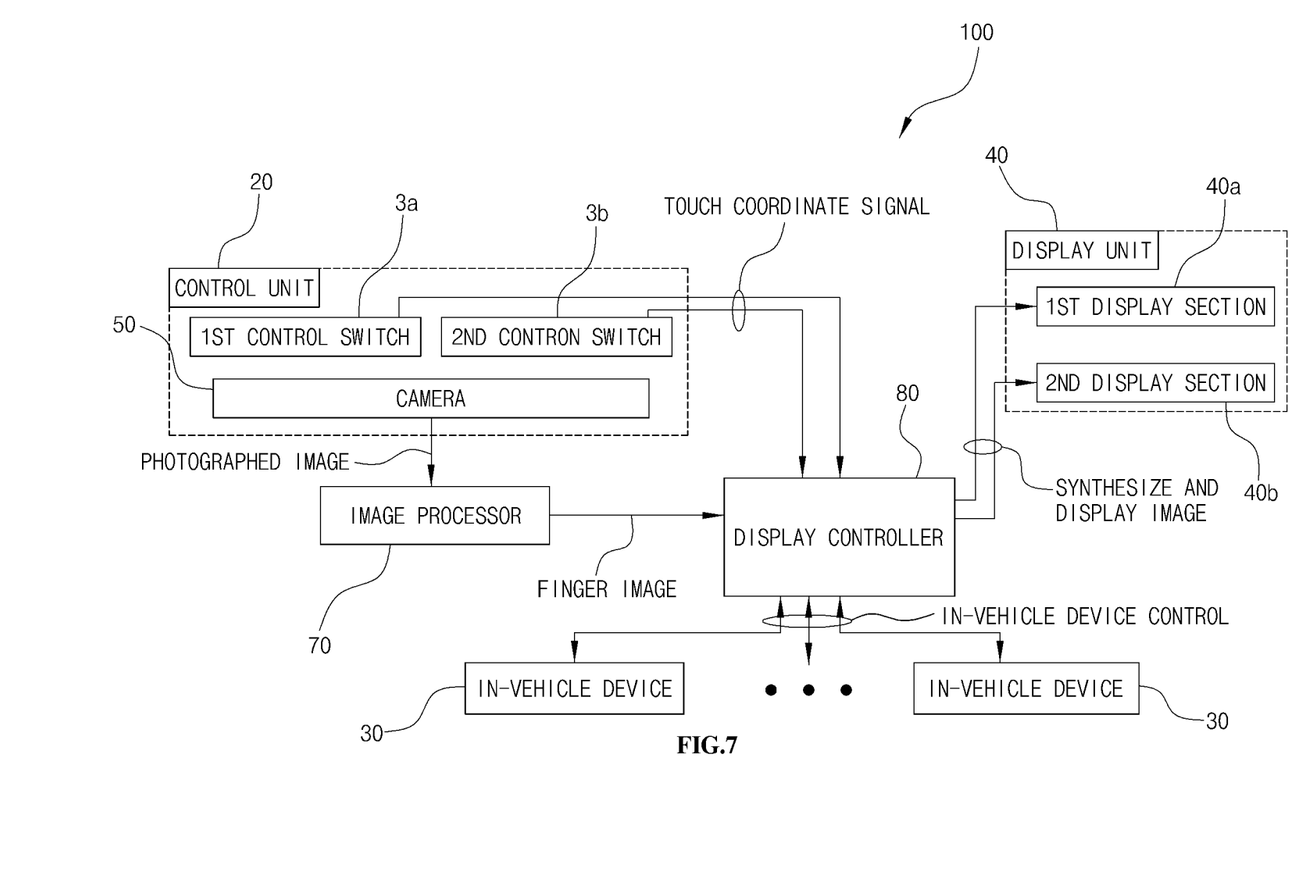
FIG. 7 is a block diagram illustrating a control circuit of the input apparatus shown in FIG. 2 (second embodiment)

In other preferred embodiments, for example as shown in FIG. 7, a block diagram illustrates a control circuit 100 of the input apparatus for in-vehicle devices of the invention. In further preferred embodiments, the control circuit 100 is illustrated on the basis of the configuration shown in FIG. 2. Preferably, the control circuit 100 includes a camera 50, a control unit 20 including a first control switch 3a and a second control switch 3b, an image processor 70 extracting the outline of fingers 2 from a photographed image of the fingers and erasing the inside of the image to be translucent or semitransparent, a display unit 40 selecting two devices from a plurality of in-vehicle devices 30 and displaying control screens of the two in-vehicle devices on first and second display sections 40a and 40b, respectively, and a display controller 80 suitably receiving the image of the fingers 2 from the image processor 70 and synthesizing the image to the control screens of the first and second display sections 40a and 40b.

As described above, the input apparatus of the invention is easy to use and preferably allows the user to easily recognize the position of the fingertips. Accordingly, the input apparatus of the invention is properly applicable as an input apparatus for in-vehicle devices.

While the present invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. An input apparatus for in-vehicle devices, comprising:
   a control unit including a recess enclosed on all but one side allowing fingers to be inserted in a substantially vertical direction from above into the recess, control surfaces on opposite inner side walls thereof, control switches disposed on the control surfaces, respectively, and a camera horizontally photographing the fingers inserted into the recess; and
   a display unit displaying an image of the fingers taken by the camera while overlaying on a control screen,
   wherein one of the control switches is used to operate a first display section of the display unit, and the other one of the control switches is used to operate a second display section of the display unit,
   wherein the control surfaces are vertical surfaces opposing each other, so that the fingers inserted into the recess are interposed between the vertical surfaces.

2. The input apparatus in accordance with claim 1, wherein one of the control switches placed between the camera and the fingers inserted into the recess is transparent.

3. The input apparatus in accordance with claim 1, wherein the control switches placed between the camera and the fingers inserted into the recess comprise a touch panel.

4. The input apparatus in accordance with claim 1, wherein the control switches placed between the camera and the fingers inserted into the recess comprise a push button switch.

5. A motor vehicle comprising the input apparatus of claim 1.

* * * * *